US010850768B2

(12) United States Patent
Wijffels et al.

(10) Patent No.: US 10,850,768 B2
(45) Date of Patent: Dec. 1, 2020

(54) SUSPENSION-SYSTEM DEGRADATION DETECTION (71) Applicant: Ford Global Technologies, LLC, Dearborn, MI (US)

(72) Inventors: Lodewijk Wijffels, Northville, MI (US); Devon Eyerman, Plymouth, MI (US); Joshua Guerra, Farmington Hills, MI (US); Donald Bradfield, Berkley, MI (US); Ronald Loyd Chadwick, Redford Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 16/127,526

(22) Filed: Sep. 11, 2018

(65) Prior Publication Data
US 2020/0079422 A1    Mar. 12, 2020

(51) Int. Cl.
*B62D 15/02*  (2006.01)
*G01M 17/06*  (2006.01)
*B60G 1/00*   (2006.01)
*B62D 6/00*   (2006.01)

(52) U.S. Cl.
CPC ............. *B62D 6/008* (2013.01); *B62D 15/02* (2013.01)

(58) Field of Classification Search
CPC ...... B62D 6/008; B62D 15/02; G07C 5/0816; B60G 17/0185
See application file for complete search history.

(56) References Cited

U.S. PATENT DOCUMENTS

| 7,941,256 B2 | 5/2011 | Namuduri et al. |
| 2003/0045983 A1* | 3/2003 | Kondo ..................... B62D 1/28 701/41 |
| 2009/0132126 A1* | 5/2009 | Tamaizumi .......... B62D 5/0484 701/42 |
| 2010/0211249 A1 | 8/2010 | McClellan |
| 2011/0190984 A1* | 8/2011 | Reeve .................. B62D 5/0457 701/41 |
| 2012/0197478 A1* | 8/2012 | Niemz ............... B62D 15/0285 701/25 |
| 2013/0060427 A1* | 3/2013 | Kataoka ............... B62D 5/0466 701/42 |
| 2016/0280130 A1 | 9/2016 | Kia et al. |
| 2016/0339757 A1* | 11/2016 | Gussen .............. B60G 17/0185 |
| 2017/0137023 A1* | 5/2017 | Anderson ............. B60W 10/22 |
| 2019/0084616 A1* | 3/2019 | Bronikowski ....... B62D 5/0472 |
| 2019/0161116 A1* | 5/2019 | Moreillon ............. B62D 1/286 |
| 2019/0193789 A1* | 6/2019 | Hosono ................ B62D 5/0466 |
| 2019/0362570 A1* | 11/2019 | Kikuta .................. G07C 5/0866 |
| 2020/0023893 A1* | 1/2020 | Naik ..................... B62D 6/008 |

FOREIGN PATENT DOCUMENTS

| FR | 3043375 B1 | 5/2018 |
| JP | 2009248905 A | 10/2009 |

* cited by examiner

*Primary Examiner* — Redhwan K Mawari
*Assistant Examiner* — Melanie J Patrick
(74) *Attorney, Agent, or Firm* — Frank A. MacKenzie; Bejin Bieneman PLC (57) ABSTRACT

A computer includes a processor and a memory storing processor-executable instructions. The processor is programmed to record steering-system torque in response to a difference between a detected steering angle and a requested steering angle exceeding an angle threshold, increment a counter based on the recorded steering-system torque, and set a repair indicator in response to the counter exceeding a counter threshold.

14 Claims, 3 Drawing Sheets

SUSPENSION-SYSTEM DEGRADATION DETECTION

BACKGROUND

Vehicles typically include suspension systems. The suspension system of a vehicle is coupled to the vehicle frame and to each wheel assembly. The suspension system absorbs and dampens shocks and vibrations from the wheel assemblies to the vehicle frame. For each wheel assembly, the suspension system includes an upper control arm, a lower control arm, a coil spring, and a shock absorber. The shock absorber typically extends through the coil springs. One end of the shock absorber and the coil spring may be connected to the lower control arm, and the other end of the shock absorber and the coil spring may be connected to the upper control arm or to the vehicle frame.

The suspension system is arranged so that an upward motion of the wheel assembly, such as when the tire hits a bump, pothole, or other road irregularity while the vehicle is in motion, compresses the coil spring and the shock absorber. The coil spring may exert a force that is a function, e.g., a linear relation, of a difference between the current length of the coil spring and a relaxed length of the coil spring. The shock absorber may exert a force that is a function of a speed of compression or extension of the shock absorber.

Over the life of the vehicle, the suspension system experiences normal "wear and tear," i.e., naturally occurring damage from use over time and aging that can impair or prevent vehicle operation. The suspension system of a vehicle will eventually fail from wear and tear.

DETAILED DESCRIPTION

The present disclosure addresses vehicle suspension and steering system wear and tear and/or preventing failures of the suspension system. Actions of a vehicle steering system can be used over time to determine over time how much force a suspension system is experiencing and how much energy the suspension system is absorbing. For example, deviations between the intended and actual steering angle can be used to detect road irregularities that cause wear and tear on the suspension system. Advantageously, it is possible to provide a more accurate estimation of the wear and tear of the suspension system than by simply using vehicle mileage as a proxy or by relying on driver "feel." A likelihood of failure of the suspension system in service can be reduced, while not subjecting the vehicle to unnecessarily early servicing.

A computer includes a processor and a memory storing processor-executable instructions. The processor is programmed to record steering-system torque in response to a difference between a detected steering angle and a requested steering angle exceeding an angle threshold, increment a counter based on the recorded steering-system torque, and set a repair indicator in response to the counter exceeding a counter threshold.

The processor may be further programmed to calculate a road-impact energy based on the recorded steering-system torque, and increment the counter based on the road-impact energy.

The processor may be further programmed to calculate a maximum steering-system torque based on the recorded steering-system torque, and increment the counter based on the maximum steering-system torque.

The processor may be further programmed to stop recording the steering-system torque in response to the difference between the detected steering angle and the requested steering angle decreasing below the angle threshold.

The counter may be an energy counter, the counter threshold may be an energy-counter threshold, and the processor may be further programmed to increment a force counter based on the recorded steering-system torque, and set the repair indicator in response to the force counter exceeding a force-counter threshold.

The difference between the detected steering angle and the requested steering angle may be a tracking error, and the processor may be further programmed to record the tracking error in response to the tracking error exceeding the angle threshold, and increment the counter based on the recorded steering-system torque and the recorded tracking error. The processor may be further programmed to calculate one of a road-impact energy or a maximum steering-system torque based on the recorded steering-system torque and the recorded tracking error, and increment the counter based on the one of the road-impact energy or the maximum steering-system torque.

The processor may be further programmed to record a steering-system speed in response to the difference between the detected steering angle and the requested steering angle exceeding the angle threshold, and increment the counter based on the recorded steering-system torque and the recorded steering-system speed. The processor may be further programmed to calculate one of a road-impact energy or a maximum steering-system torque based on the recorded steering-system torque and the recorded steering-system speed, and increment the counter based on the one of the road-impact energy or the maximum steering-system torque.

A method includes recording steering-system torque in response to a difference between a detected steering angle and a requested steering angle exceeding an angle threshold, incrementing a counter based on the recorded steering-system torque, and outputting a flag in response to the counter exceeding a counter threshold.

The method may further include calculating a road-impact energy based on the recorded steering-system torque, and incrementing the counter based on the road-impact energy.

The method may further include calculating a maximum steering-system torque based on the recorded steering-system torque, and incrementing the counter based on the maximum steering-system torque.

The method may further include stopping recording the steering-system torque in response to the difference between the detected steering angle and the requested steering angle decreasing below the angle threshold.

The counter may be an energy counter, the counter threshold may be an energy-counter threshold, and the method may further include incrementing a force counter based on the recorded steering-system torque, and setting the repair indicator in response to the force counter exceeding a force-counter threshold.

The difference between the detected steering angle and the requested steering angle may be a tracking error, and the method may further include recording the tracking error in response to the tracking error exceeding the angle threshold, and incrementing the counter based on the recorded steering-system torque and the recorded tracking error. The method may further include calculating one of a road-impact energy or a maximum steering-system torque based on the recorded steering-system torque and the recorded tracking error, and incrementing the counter based on the one of the road-impact energy or the maximum steering-system torque.

The method may further include recording a steering-system speed in response to the difference between the detected steering angle and the requested steering angle exceeding the angle threshold, and incrementing the counter based on the recorded steering-system torque and the recorded steering-system speed. The method may further include calculating one of a road-impact energy or a maximum steering-system torque based on the recorded steering-system torque and the recorded steering-system speed, and incrementing the counter based on the one of the road-impact energy or the maximum steering-system torque.

With reference to the Figures, a computer 30 in a vehicle 32 includes a processor and a memory storing processor-executable instructions. The processor is programmed to record steering-system torque in response to a difference between a detected steering angle and a requested steering angle exceeding an angle threshold, increment a counter based on the recorded steering-system torque, and set a repair indicator in response to the counter exceeding a counter threshold.

Figure 1:
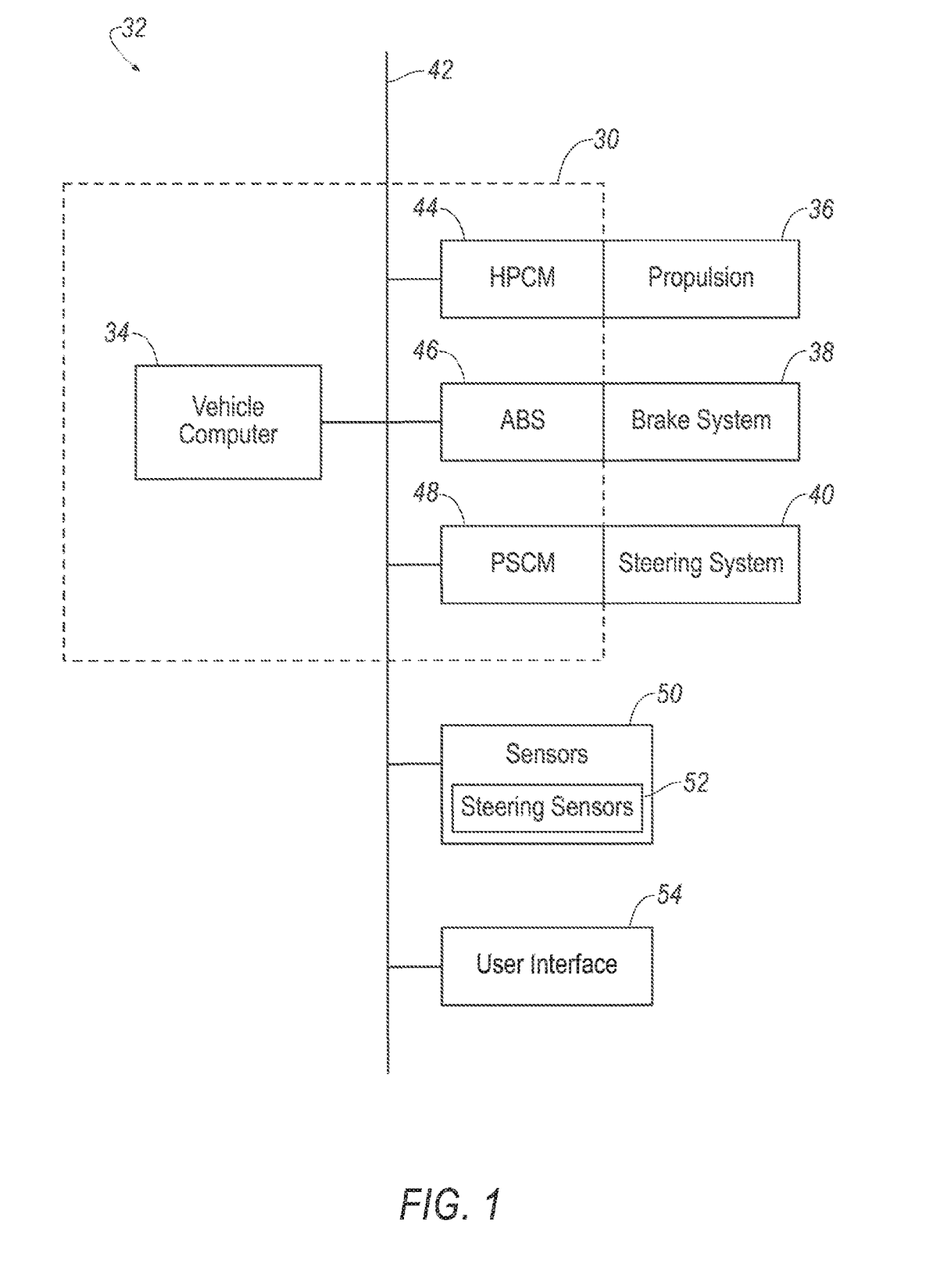
FIG. 1 is a block diagram of an example vehicle.

With reference to FIG. 1, the vehicle 32 may be any passenger or commercial automobile such as a car, a truck, a sport utility vehicle, a crossover, a van, a minivan, a taxi, a bus, etc.

The vehicle 32 may be an autonomous, semi-autonomous, or nonautonomous vehicle. A vehicle computer 34 can be programmed to operate the vehicle 32 independently of the intervention of a human driver, completely or to a lesser degree. The vehicle computer 34 may be programmed to operate a propulsion 36, brake system 38, steering system 40, and/or other vehicle systems. For the purposes of this disclosure, autonomous operation means the vehicle computer 34 controls the propulsion 36, brake system 38, and steering system 40 without input from a human driver; semi-autonomous operation means the vehicle computer 34 controls one or two of the propulsion 36, brake system 38, and steering system 40 and a human driver controls the remainder, or that the vehicle computer 34 controls the propulsion 36, brake system 38, and steering system 40 without input from a human driver in predefined contexts and not outside those contexts; and nonautonomous operation means a human driver controls the propulsion 36, brake system 38, and steering system 40.

The vehicle computer 34 is a microprocessor-based computer. The vehicle computer 34 includes a processor, memory, etc. The memory of the vehicle computer 34 includes memory for storing instructions executable by the processor as well as for electronically storing data and/or databases.

The computer 30 is one or more microprocessor-based computers. The computer 30 includes memory, at least one processor, etc. The memory of the computer 30 includes memory for storing instructions executable by the processor as well as for electronically storing data and/or databases. The computer 30 may be the same computer as the vehicle computer 34, or the computer 30 may be one or more separate computers in communication with the vehicle computer 34 via a communications network 42, or the computer 30 may encompass multiple computers including the vehicle computer 34. As a separate computer, the computer 30 may be or include, e.g., one or more electronic control units or modules (ECU or ECM) such as a hybrid-powertrain control module 44, an antilock brake control module 46, and/or a power-steering control module 48.

The computer 30 may transmit and receive data through the communications network 42, which may be a controller area network (CAN) bus, Ethernet, WiFi, Local Interconnect Network (LIN), onboard diagnostics connector (OBD-II), and/or by any other wired or wireless communications network. The computer 30 may be communicatively coupled to the vehicle computer 34, the other ECMs 44, 46, 48, the propulsion 36, the brake system 38, the steering system 40, sensors 50 including steering sensors 52, a user interface 54, and other components via the communications network 42.

The propulsion 36 of the vehicle 32 generates energy and translates the energy into motion of the vehicle 32. The propulsion 36 may be a known vehicle propulsion subsystem, for example, a conventional powertrain including an internal-combustion engine coupled to a transmission that transfers rotational motion to road wheels 56; an electric powertrain including batteries, an electric motor, and a transmission that transfers rotational motion to the road wheels 56; a hybrid powertrain including elements of the conventional powertrain and the electric powertrain; or any other type of propulsion. The propulsion 36 can include an electronic control unit (ECU) or the like that is in communication with and receives input from the vehicle computer 34 and/or a human driver, e.g., the hybrid-powertrain control module 44. The human driver may control the propulsion 36 via, e.g., an accelerator pedal and/or a gear-shift lever.

The brake system 38 is typically a known vehicle braking subsystem and resists the motion of the vehicle 32 to thereby slow and/or stop the vehicle 32. The brake system 38 may include friction brakes such as disc brakes, drum brakes, band brakes, etc.; regenerative brakes; any other suitable type of brakes; or a combination. The brake system 38 can include an electronic control unit (ECU) or the like that is in communication with and receives input from the vehicle computer 34 and/or a human driver, e.g., the antilock brake control module 46. The human driver may control the brake system 38 via, e.g., a brake pedal.

The steering system 40 is typically a known vehicle steering subsystem and controls the turning of the road wheels 56. The steering system 40 may be a rack-and-pinion system with electric power-assisted steering, a steer-by-wire system, or any other suitable system. The steering system 40 can include an electronic control unit (ECU) or the like that is in communication with and receives input from the vehicle computer 34 and/or a human driver, e.g., the power-steering control module 48. The human driver may control the steering system 40 via, e.g., a steering wheel 58, hand-held remote control (not shown), etc.

The sensors 50 provide data for autonomous operation of the vehicle 32. The sensors 50 may provide data about operation of the vehicle 32, for example, engine and transmission data such as temperature, fuel consumption, etc.; data about the steering system 40 from the steering sensors 52 (described below); etc. The sensors 50 may detect the location and/or orientation of the vehicle 32. For example, the sensors may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 50 may detect the external world, e.g., objects and/or characteristics of surroundings of the vehicle 32, such as other vehicles, road lane markings, traffic lights and/or signs, pedestrians, etc. For example, the sensors 50 may include radar sensors, scanning laser range finders, light detection and ranging (LIDAR) devices, and image processing sensors such as cameras. The sensors 50 may include communications devices, for example, vehicle-to-infrastructure (V2I) or vehicle-to-vehicle (V2V) devices.

The user interface 54 presents information to and receives information from an occupant of the vehicle 32. The user interface 54 may be located, e.g., on an instrument panel in a passenger cabin of the vehicle 32, or wherever may be readily seen or heard by the occupant. The user interface 54 may include dials, digital readouts, screens, speakers, and so on for providing information to the occupant, e.g., human-machine interface (HMI) elements such as are known. The user interface 54 may include buttons, knobs, keypads, microphones, and so on for receiving information from the occupant.

Figure 2:
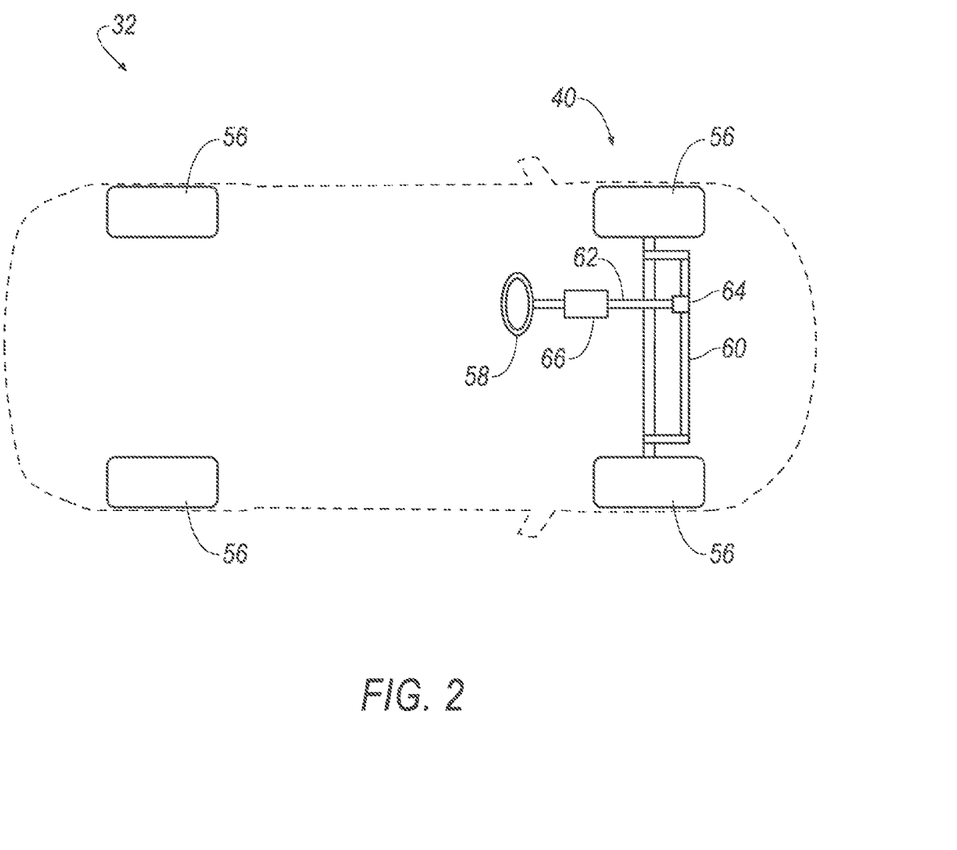
FIG. 2 is a diagram of an example steering system of the vehicle of FIG. 1.

With reference to FIG. 2, the steering system 40 may be a conventional rack-and-pinion steering system. Alternatively or additionally, the steering system 40 may be a Pitman-arm system, a rear-steer system, a steer-by-wire system, etc. (not shown). A steering rack 60 may be turnably coupled to the road wheels 56, for example, in a four-bar linkage. The position of the steering rack 60 determines the turning of the road wheels 56. Translational motion of the steering rack 60 results in turning of the road wheels 56. A steering column 62 may be coupled to the steering rack 60 via a rack and pinion 64, that is, gear meshing between a pinion gear and a rack gear (not shown).

The steering column 62 transfers rotation of the steering wheel 58 to movement of the steering rack 60. The steering column 62 may be, e.g., a shaft connecting the steering wheel 58 to the steering rack 60. The steering column 62 may house a clutch and one or more of the steering sensors 52 such as a torque sensor (not shown).

The steering wheel 58 allows an operator to steer the vehicle 32 by transmitting rotation of the steering wheel 58 to movement of the steering rack 60. The steering wheel 58 may be, e.g., a rigid ring fixedly attached to the steering column 62.

A steering motor 66 is coupled to the steering system 40, e.g., the steering column 62, the steering rack 60, etc., so as to cause turning of the road wheels 56. For example, the steering motor 66 may be an electric motor rotatably coupled to the steering column 62, that is, coupled so as to be able to apply a torque to the steering column 62. The steering motor 66 may provide power assist to the steering system 40. In other words, the steering motor 66 may provide torque in a direction in which the steering wheel 58 is being rotated by a human driver, allowing the driver to turn the steering wheel 58 with less effort. The steering motor 66 may be an electric power-assisted steering actuator.

Alternatively to the rack-and-pinion steering system, the steering system 40 may be a steer-by-wire steering system, i.e., may have a gap in mechanical linkages between the steering wheel 58 and the road wheels 56. If the vehicle 32 is a fully autonomous vehicle, the steering system 40 may be a steer-by-wire steering system lacking the steering wheel 58 and the steering column 62. The computer 30, e.g., the power-steering control module 48, may receive signals from the steering sensors 52, e.g., a position sensor positioned to detect the orientation of the steering wheel 58, or from the vehicle computer 34. The position sensor may be, e.g., a Hall effect sensor, a rotary encoder, etc. The computer 30 may output a signal to the steering motor 66. The steering motor 66 may be one or more electromechanical actuators coupled to the steering rack 60 in lieu of the rack and pinion 64, or otherwise turnably coupled to the road wheels 56, and the steering motor 66 may transform the signal into mechanical motion of the steering rack 60 and/or turning of the road wheels 56.

Returning to FIG. 1, the steering sensors 52 provide data about components of the steering system 40. For example, the steering sensors 52 include wheel-speed sensors for the road wheels 56; position or inertial sensors on components of the steering system 40 such as the steering wheel 58, the steering column 62, the rack and pinion 64, or the steering rack 60; torque sensors on components of the steering system 40 such as the steering column 62, the rack and pinion 64, or the steering motor 66; and voltage or current sensors on leads of the steering motor 66.

Figure 3:
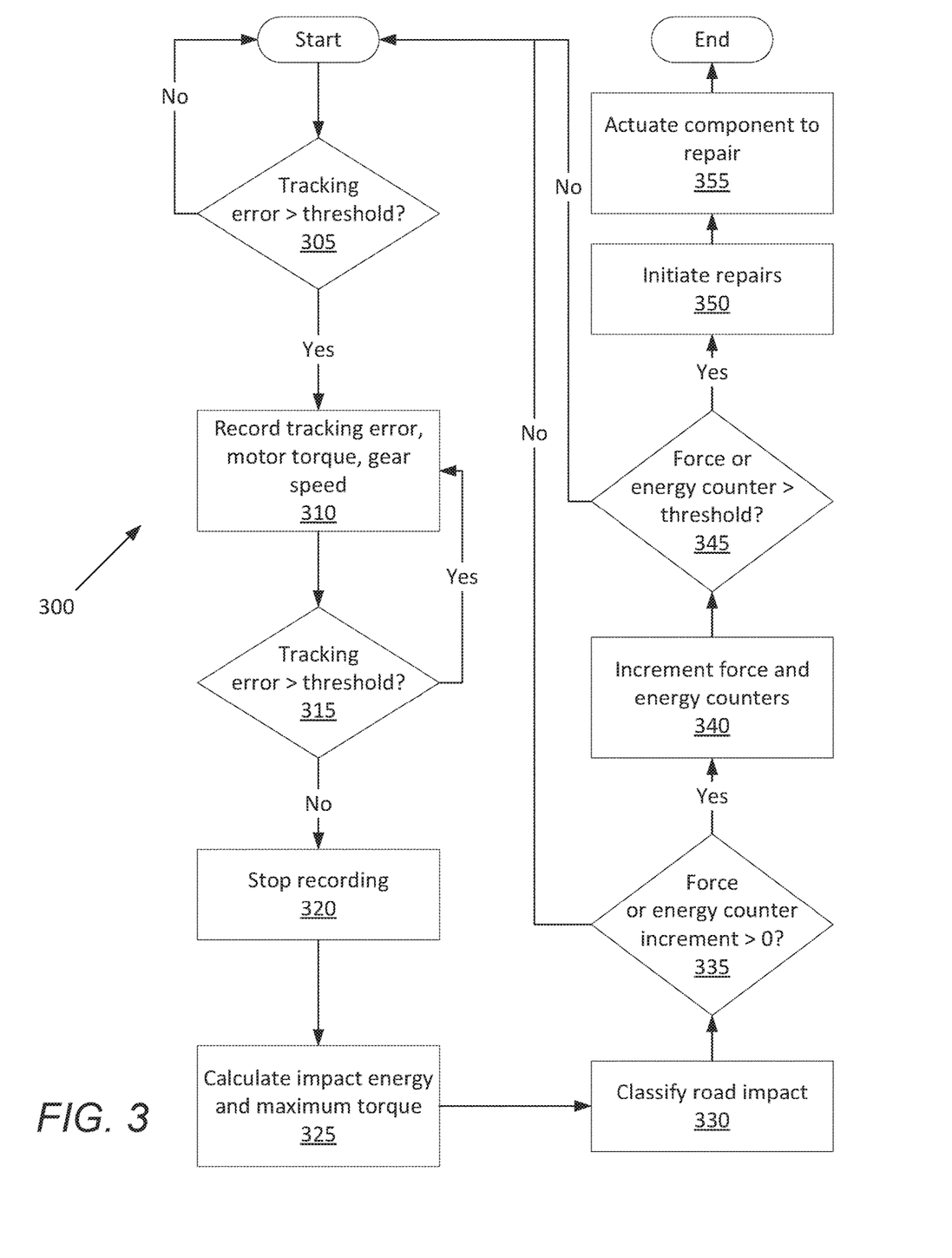
FIG. 3 is a process flow diagram of an example process for repairing the vehicle based on measuring the steering system of FIG. 2.

FIG. 3 is a process flow diagram illustrating an exemplary process 300 for repairing the vehicle 32 based on measuring the steering system 40. The memory of the computer 30, in particular of the vehicle computer 34 and of the power-steering control module 48, stores executable instructions for performing the steps of the process 300. The process 300 may be performed when the vehicle 32 is in an autonomous mode for a conventional steering system 40, and the process 300 may be performed regardless of the autonomy mode for a steer-by-wire steering system 40. In general, in the process 300, the computer 30 records tracking error, steering-system torque, and steering-system speed while the tracking error is above an angle threshold; increments a force counter and an energy counter based on the recorded tracking error, steering-system torque, and steering-system speed; and initiates repairs based on the counters, as all described in more detail below.

For the purposes of this disclosure, "tracking error" is defined as a difference between a measured steering angle and a requested steering angle; "steering-system torque" is defined as the torque experienced by the steering system 40, e.g., a sum of torque produced by the steering motor 66 and inertial torque from the rotational acceleration of the steering system 40; and "steering-system speed" is defined as a rate of change of an angular or linear position of the steering rack 60, or of a component that moves determinedly with the steering rack 60, i.e., whose position is defined by the position of the steering rack 60. The steering angle is an angle between a direction that the road wheels 56 are turned and an axis defined relative to a body of the vehicle 32, e.g., a longitudinal centerline of the vehicle 32. For example, in an implementation, when the road wheels 56 are turned straight forward, the steering angle is zero; when the road wheels 56 are turned to the right, the steering angle has a positive value; and when the road wheels 56 are turned to the left, the steering angle has a negative value. The detected steering angle is the steering angle as reported by the steering sensors 52. The requested steering angle is the steering angle that, e.g., the vehicle computer 34 or the power-steering control module 48 commands the steering system 40 to produce.

The process 300 uses the angle threshold, a force-counter threshold for the force counter, an energy-counter threshold for the energy counter, and increments for the force and energy counters, as described in more detail below. The angle threshold, the force-counter threshold, the energy-counter threshold, and the increments may be chosen together based on statistical data of the respective values that contribute to the degradation of the suspension system. For example, a series of run-to-failure life-cycle tests may be performed on the suspension system, each test using repeated application of one of a variety of sizes of road irregularities, during which the tracking error, the force applied to the suspension system, and the energy absorbed by the suspension system are recorded. The angle threshold may be the tracking error below which the road irregularities contribute a small or negligible amount to a decrease in the lifetime of the suspension system. The force-counter threshold and the increments of the force counter may be chosen together. The force-counter threshold represents the cumulative forces applied to the suspension system over a lifetime, and the increments are fractions of the cumulative force used up by road irregularities applying respective energies and maximum torques to the suspension system. The energy-counter threshold and the increments of the energy counter may be chosen together. The energy-counter threshold represents a total energy absorbed by the suspension system over a lifetime, and the increments represent fractions of the total energy used up by road irregularities imparting respective energies and maximum torques to the suspension system. The increments of the force and energy counters may be stored in a lookup table, as described below with respect to the block 330.

The process 300 begins in a decision block 305, in which the computer 30 determines whether the tracking error, i.e., the difference between the detected steering angle and the requested steering angle, exceeds the angle threshold. If the tracking error exceeds the threshold, then it is likely that the vehicle 32 has run over a road irregularity such as a pothole, i.e., this instance of tracking error should be stored. The computer 30 receives the detected steering angle from the steering sensors 52. The computer 30 receives the requested steering angle from the vehicle computer 34, the power-steering control module 48, and/or its own memory. The angle threshold is a value stored in the memory. The angle threshold may be chosen based on statistical data of values of the tracking error that contribute to the degradation of the suspension system, for example, as described above. If the tracking error is below the angle threshold, the process 300 restarts.

If the tracking error is above the angle threshold, next, in a block 310, the computer 30 records the tracking error, the steering-system torque, and the steering-system speed. The tracking error, the steering-system torque, and the steering-system speed may be directly measured or may be calculated. For example, the tracking error may be calculated by subtracting the measured steering angle and the requested steering angle. For another example, the steering-system torque may be calculated as $T=T_{motor}+J_{steering}*d\omega/dt$, in which $T_{motor}$ is the steering-motor torque; $J_{steering}$ is an inertia of the steering system 40 and the road wheels 56; $\omega$ is the steering-system speed; and t is time. The motor torque $T_{motor}$ may be measured directly or indirectly, such as via the current, voltage, or phase current/voltage of winding(s) of the steering motor 66. The computer 30 may store the values of the tracking error, the steering-system torque, and the steering-system speed at periodic time increments, such as each 0.01 seconds.

Next, in a decision block 315, the computer 30, after waiting a time increment such as described above, again determines whether the tracking error exceeds angle threshold, as described above with respect to the decision block 305. If the tracking error still exceeds the angle threshold, the process 300 returns to the block 310 to continue recording the tracking error, the steering-system torque, and the steering-system speed.

If the tracking error has decreased below the angle threshold, next, in a block 320, the computer 30 stops recording the tracking error, the steering-system torque, and the steering-system speed. In other words, the computer 30 records the tracking error, the steering-system torque, and the steering-system speed while the vehicle 32 is experiencing a disturbance from the road irregularity, as represented by the tracking error exceeding the angle threshold for a period.

Next, in a block 325, the computer 30 calculates a road-impact energy and a maximum steering-system torque based on the recorded tracking error, the recorded steering-system torque, and/or the recorded steering-system speed. The road-impact energy may be a function (in the mathematical sense) of the recorded tracking error, the recorded steering-motor torque component of the steering-system torque, and/or the recorded steering-system speed. For example, the road-impact energy may be calculated using this equation:

$$E = \int_{t_1}^{t_2} \left( J_{steering} \cdot \frac{d\omega}{dt} - T_{motor} \right) \cdot \omega \cdot dt$$

in which E is the road-impact energy; $t_1$ and $t_2$ are the start and end times, respectively, of recording; $J_{steering}$ is an inertia of the steering system 40 and the road wheels 56; $\omega$ is the steering-system speed; t is time; and $T_{motor}$ is the steering-motor torque. As noted above with respect to the decision blocks 305 and 315, the tracking error determines the start time $t_1$ and end time $t_2$. The maximum steering-system torque $T_{max}$ may be the largest value of the steering-system torque T recorded from $t_1$ to $t_2$.

Next, in a block 330, the computer 30 classifies the road impact by selecting an increment for a force counter and an increment for an energy counter. The force counter represents wear and tear on the suspension system from forces applied to the suspension system over time, and the energy counter represents wear and tear on the suspension system from energy absorbed by the suspension system over time. The increments represent increases to the counters from the road irregularity that caused the recording. The computer 30 may determine the increments by consulting lookup tables stored in the memory of the computer 30, such as the following two tables.

| E | Energy Increment | $T_{max}$ | Force Increment |
|---|---|---|---|
| 0-500 J | 0 | <150 N-m | 0 |
| 501-1000 J | 1 | 151-200 N-m | 1 |
| >1000 J | 5 | >250 N-m | 5 |

In the example lookup tables, the row in the first table is chosen according to the road-impact energy E, and the value in the cell is the increment to the energy counter. The row in the second table is chosen according to the maximum torque $T_{max}$, and the value in the cell is the increment to the force counter. The values for the increments to the force and energy counters may be chosen by using computer-aided engineering (CAE) calculations and durability data from driving over known obstacles, for example, as described above. The values for the increments may be chosen independently for each model of the vehicle 32.

Next, in a decision block 335, the computer 30 determines whether either the increment to the force counter or the increment to the energy counter is greater than zero, in other words, whether the road irregularity likely caused some long-term wear and tear. If both increments are zero, the process 300 restarts.

If either increment is greater than zero, next, in a block 340, the computer 30 increments the force and energy counters by their respective increments. In other words, the computer 30 sums the previously stored force counter and the increment to the force counter and stores the result as the force counter, and the computer 30 sums the previously stored energy counter and the increment to the energy counter and stores the result as the energy counter. The current values for the force counter and the energy counter are stored in the memory of the computer 30. The counters are thus incremented based on the tracking error, the steering-system torque, and the steering-system speed, for example, as used to determine the road-impact energy and the maximum torque, and thus to determine the increments.

Next, in a decision block 345, the computer 30 determines whether either the force counter exceeds a force-counter threshold or the energy counter exceeds an energy-counter threshold. The force-counter threshold and the energy-counter threshold are stored in the memory of the computer 30. The force-counter threshold and the energy-counter threshold may be chosen by using CAE calculations and durability data from driving over known obstacles, for example, as described above. The values for the respective thresholds may be chosen independently for each model of the vehicle 32. The thresholds may be chosen in tandem with choosing the values for the increments in the lookup table, with the thresholds representing a lifespan of the suspension system and the increments representing a share of the lifespan used up by the road irregularity. If neither the force counter exceeds the force-counter threshold nor the energy counter exceeds the energy-counter threshold, then the process 300 restarts.

If either the force counter exceeds the force-counter threshold or the energy counter exceeds the energy-counter threshold, next, in a block 350, the computer 30 outputs a flag. The flag is a communication to an actor able to have the vehicle 32 repaired. For example, the repair indicator may be a light or chime from the user interface 54 to an occupant of the vehicle 32, perhaps coupled with a code in the on-board diagnostics system. For another example, the repair indicator may be a message sent to a remote server at a headquarters in charge of a fleet of vehicles including the vehicle 32. For yet another example, the repair indicator may be a message to the vehicle computer 34 instructing the vehicle computer 34 to autonomously drive the vehicle 32 to a repair facility. The computer 30 may also set a diagnostic trouble code (DTC) along with the flag.

Next, in a block 355, the computer 30 actuates components of the vehicle 32 to inspect and/or repair the suspension system of the vehicle 32. For example, the vehicle computer 34 may actuate the propulsion 36, the brake system 38, and the steering system 40 using information from the sensors 50 to navigate the vehicle 32 to the repair facility, using known autonomous-driving algorithms. A technician at the repair facility may consult the DTC and inspect the components of the suspension system and/or the steering system 40. For example, the technician may inspect the springs, shock absorbers, bushings, bearings, joints, knuckles, etc. of the suspension system. After the block 355, the process 300 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing processor-executable instructions, the processor programmed to:
   start recording steering-system torque over time in response to a difference between a detected steering angle and a requested steering angle exceeding an angle threshold;
   stop recording the steering-system torque in response to the difference between the detected steering angle and the requested steering angle decreasing below the angle threshold;
   after stopping recording, calculate a road-impact energy for a period from starting recording to ending recording based on the steering-system torque over time;
   increment a counter based on the calculated road-impact energy; and
   output a flag in response to the counter exceeding a counter threshold.

2. The computer of claim 1, wherein the processor is further programmed to calculate a maximum steering-system torque based on the recorded steering-system torque, and increment the counter based on the maximum steering-system torque.

3. The computer of claim 1, wherein the counter is an energy counter, the counter threshold is an energy-counter threshold, and the processor is further programmed to increment a force counter based on the recorded steering-system torque, and output the flag in response to the force counter exceeding a force-counter threshold.

4. The computer of claim 1, wherein the difference between the detected steering angle and the requested steering angle is a tracking error, and the processor is further programmed to record the tracking error in response to the tracking error exceeding the angle threshold, and increment the counter based on the recorded steering-system torque and the recorded tracking error.

5. The computer of claim 4, wherein the processor is further programmed to calculate a maximum steering-system torque based on the recorded steering-system torque and the recorded tracking error, and increment the counter based on the maximum steering-system torque.

6. The computer of claim 1, wherein the processor is further programmed to record a steering-system speed in response to the difference between the detected steering angle and the requested steering angle exceeding the angle threshold, and increment the counter based on the recorded steering-system torque and the recorded steering-system speed.

7. The computer of claim 6, wherein the processor is further programmed to calculate one of the road-impact energy or a maximum steering-system torque based on the recorded steering-system torque and the recorded steering-system speed, and increment the counter based on the one of the road-impact energy or the maximum steering-system torque.

8. A method comprising:
   starting recording steering-system torque over time in response to a difference between a detected steering angle and a requested steering angle exceeding an angle threshold;
   stopping recording the steering-system torque in response to the difference between the detected steering angle and the requested steering angle decreasing below the angle threshold;
   after stopping recording, calculating a road-impact energy for a period from starting recording to ending recording based on the steering-system torque over time;
   incrementing a counter based on the calculated road-impact energy; and outputting a flag in response to the counter exceeding a counter threshold.

9. The method of claim 8, further comprising calculating a maximum steering-system torque based on the recorded steering-system torque, and incrementing the counter based on the maximum steering-system torque.

10. The method of claim 8, wherein the counter is an energy counter, and the counter threshold is an energy-counter threshold, the method further comprising incrementing a force counter based on the recorded steering-system torque, and outputting the flag in response to the force counter exceeding a force-counter threshold.

11. The method of claim 8, wherein the difference between the detected steering angle and the requested steering angle is a tracking error, the method further comprising recording the tracking error in response to the tracking error exceeding the angle threshold, and incrementing the counter based on the recorded steering-system torque and the recorded tracking error.

12. The method of claim 11, further comprising calculating a maximum steering-system torque based on the recorded steering-system torque and the recorded tracking error, and incrementing the counter based on the maximum steering-system torque.

13. The method of claim 8, further comprising recording a steering-system speed in response to the difference between the detected steering angle and the requested steering angle exceeding the angle threshold, and incrementing the counter based on the recorded steering-system torque and the recorded steering-system speed.

14. The method of claim 13, further comprising calculating one of the road-impact energy or a maximum steering-system torque based on the recorded steering-system torque and the recorded steering-system speed, and incrementing the counter based on the one of the road-impact energy or the maximum steering-system torque.

\* \* \* \* \*